April 19, 1927.  N. KÜCHEN  1,625,777
BRAKE FOR VEHICLES
Filed Dec. 8, 1924
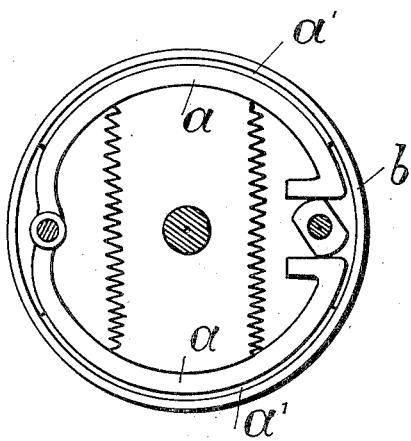

Patented Apr. 19, 1927.

1,625,777

UNITED STATES PATENT OFFICE.

NICOLAUS KÜCHEN, OF AACHEN, GERMANY.

BRAKE FOR VEHICLES.

Application filed December 8, 1924, Serial No. 754,644, and in Germany May 10, 1924.

This invention relates to a brake for vehicles, especially motor-driven vehicles. The object of the invention is to substitute a different suitable material for the cast iron, reinforced asbestos tissue, wood or the like, from which one of the brake surfaces is commonly made. The use of cast iron surfaces presents the inconvenience that the surface is worn after a short time owing to the softness of the cast iron and that it must be exchanged. The wire-asbestos tissue which is also used as lining of the brake band presents the same inconvenience as the cast iron that it is worn off too quickly and must be frequently exchanged as linings of the brake band made from this material wear rapidly owing to the little resistance of the wires and ravel out. Brakes lined with such material jerk when they are suddenly applied whereby the engine and the toothed wheels are very unfavourably influenced.

An internally acting brake for motor cars, constructed according to the invention, is diagrammatically shown, in the only figure of the accompanying drawing.

The linings $a'$ of the brake block $a$ are made from the above stated alloy. The part $b$ of the brake drum co-operating with the linings $a'$ is made from steel or from any other convenient material.

These inconveniences are avoided, according to the invention, by using as material for lining the braking surface an alloy of copper (58 to 64 parts), zinc (32–38 parts), manganese (0.5 to 2.5 parts), iron (0.5 to 2 parts) and aluminum (0.01 to 2 parts). For the countercontact surface, designed to co-operate with the braking surface, the same materials hitherto used for the same can be used, for instance steel. The element of the brake lined with the above-mentioned alloy is preferably constructed as brake block, brake cheek, brake band, brake disk or the like. A brake constructed in accordance with the invention is very resistant as the wear is reduced to a minimum. Although a brake lining of the above-mentioned alloy is more expensive than a brake lining of cast iron it is—in the long run—cheaper than a cast iron lining for the reason stated above. As frequent exchanging is no longer necessary time and work is saved. Brake linings made from the alloy mentioned can be bent and stretched at cold state whereby the fittings is considerably facilitated.

I claim:—

A brake lining, especially for motor vehicles made from an alloy of copper (58 to 64 parts), zinc (32 to 38 parts), manganese (0.5 to 2.5 parts), iron (0.5 to 2 parts) and aluminum (0.01 to 2 parts).

In testimony whereof I affix my signature.

NICOLAUS KÜCHEN.